(12) United States Patent
Kline (10) Patent No.: US 6,977,578 B2
(45) Date of Patent: Dec. 20, 2005

(54) METHOD OF ISOLATING DATA IN A POWER LINE COMMUNICATIONS NETWORK

(75) Inventor: Paul A. Kline, Gaithersburg, MD (US)

(73) Assignee: Current Technologies, LLC, Germantown, MD (US)

(*) Notice: Subject to any disclaimer, the term of this patent is extended or adjusted under 35 U.S.C. 154(b) by 446 days.

(21) Appl. No.: 09/765,910

(22) Filed: Jan. 19, 2001

(65) Prior Publication Data

US 2001/0045888 A1 Nov. 29, 2001

Related U.S. Application Data

(60) Provisional application No. 60/177,237, filed on Jan. 20, 2000.

(51) Int. Cl.[7] .............................................. H04M 11/04
(52) U.S. Cl. ........................ 340/310.01; 340/310.07; 370/501
(58) Field of Search ................... 340/310.01–310.08; 370/501, 502; 375/219, 258

(56) References Cited

U.S. PATENT DOCUMENTS

| | | | |
|---|---|---|---|
| 1,547,242 A | 7/1925 | Strieby | |
| 2,298,435 A | 10/1942 | Tunick | |
| 2,577,731 A | 12/1951 | Berger | 179/2.5 |
| 3,369,078 A | 2/1968 | Stradley | 179/2.5 |
| 3,445,814 A | 5/1969 | Spalti | 340/151 |
| 3,605,009 A | 9/1971 | Enge | 323/93 |

(Continued)

FOREIGN PATENT DOCUMENTS

| | | |
|---|---|---|
| DE | 197 28 270 A1 | 1/1999 |
| DE | 100 08 602 A1 | 6/2001 |
| DE | 100 12 235 C2 | 12/2001 |
| DE | 100 47 648 A1 | 4/2002 |
| DE | 100 61 584 A1 | 6/2002 |
| DE | 100 61 586 A1 | 6/2002 |

(Continued)

OTHER PUBLICATIONS

Hiroshi, T., *Patent Abstracts of Japan*, Publication No. 10200544, published Jul. 31, 1998, 1 page.
U.S. Appl. No. 09/805,638, filed Mar. 14, 2001, Kline.
U.S. Appl. No. 09/835,532, filed Apr. 16, 2001, Kline.
U.S. Appl. No. 09/837,972, filed Apr. 19, 2001, Kline et al.
U.S. Appl. No. 09/912,633, filed Jul. 25, 2001, Kline.
U.S. Appl. No. 09/915,459, filed Jul. 26, 2001, Kline.
U.S. Appl. No. 09/924,730, filed Aug. 8, 2001, Kline.
U.S. Appl. No. 10/016,998, filed Dec. 14, 2001, Kline.
U.S. Appl. No. 10/036,914, filed Dec. 21, 2001, Mollenkopf et al.

(Continued)

*Primary Examiner*—Phung T. Nguyen
(74) *Attorney, Agent, or Firm*—Mel Barnes; Manelli Denison & Selter PLLC (57) ABSTRACT

Isolating data in a power line communications system. Although plural subscribers receive electric power distributed from a common distribution transformer, it is desirable to isolate their branch lines from one another when those branch lines are used to conduct data communications as a supplement to electric power delivery. This isolation of branch lines implemented in a centralized way at the distribution transformer, or alternatively, in a distributed way at each subscriber's premises. These implementations are made using low pass filters (which pass the power but block the data) and power line communications routers or power line communications repeaters.

42 Claims, 7 Drawing Sheets

U.S. PATENT DOCUMENTS

| | | | |
|---|---|---|---|
| 3,641,536 A | 2/1972 | Prosprich | 340/870.15 |
| 3,656,112 A * | 4/1972 | Paull | 340/870.02 |
| 3,696,383 A | 10/1972 | Oishi et al. | 340/310 |
| 3,701,057 A | 10/1972 | Hoer | 333/112 |
| 3,702,460 A | 11/1972 | Blose | 340/150 |
| 3,810,096 A | 5/1974 | Kabat et al. | 340/147 R |
| 3,846,638 A | 11/1974 | Wetherell | 307/3 |
| 3,895,370 A | 7/1975 | Valentini | 340/310 |
| 3,900,842 A | 8/1975 | Calabro et al. | 340/310.03 |
| 3,911,415 A | 10/1975 | Whyte | 340/310 A |
| 3,942,168 A | 3/1976 | Whyte | 340/310.01 |
| 3,942,170 A | 3/1976 | Whyte | 340/310 |
| 3,962,547 A | 6/1976 | Pattantyus-Abraham | 179/2.5 R |
| 3,964,048 A | 6/1976 | Lusk et al. | 340/310 R |
| 3,967,264 A * | 6/1976 | Whyte et al. | 340/310.08 |
| 3,973,087 A * | 8/1976 | Fong | 340/310.06 |
| 3,973,240 A | 8/1976 | Fong | 340/151 |
| 3,993,989 A | 11/1976 | Held et al. | 340/310 R |
| 4,004,110 A | 1/1977 | Whyte | 179/170 J |
| 4,004,257 A | 1/1977 | Geissler | 333/207 |
| 4,012,733 A | 3/1977 | Whyte | 340/310 |
| 4,016,429 A | 4/1977 | Vercellotti et al. | 307/149 |
| 4,017,845 A | 4/1977 | Kilian et al. | 340/310.02 |
| 4,053,876 A | 10/1977 | Taylor | 340/253 H |
| 4,057,793 A | 11/1977 | Johnson et al. | 340/310 R |
| 4,060,735 A | 11/1977 | Pascucci et al. | 307/3 |
| 4,070,572 A | 1/1978 | Summerhayes | 250/199 |
| 4,119,948 A | 10/1978 | Ward et al. | 340/870.02 |
| 4,142,178 A | 2/1979 | Whyte et al. | 340/310 |
| 4,188,619 A | 2/1980 | Perkins | 340/310 R |
| 4,239,940 A | 12/1980 | Dorfman | 179/2.51 |
| 4,250,489 A | 2/1981 | Dudash et al. | 340/147 T |
| 4,254,402 A | 3/1981 | Perkins | 340/310 R |
| 4,263,549 A | 4/1981 | Toppeto | 324/127 |
| 4,268,818 A | 5/1981 | Davis et al. | 340/870.38 |
| 4,323,882 A | 4/1982 | Gajjar | 340/310 R |
| 4,357,598 A | 11/1982 | Melvin, Jr. | 340/310 A |
| 4,359,644 A | 11/1982 | Foord | 307/40 |
| 4,367,522 A | 1/1983 | Forstbauer et al. | 363/137 |
| 4,383,243 A | 5/1983 | Krügel et al. | 340/310 R |
| 4,386,436 A | 5/1983 | Kocher et al. | 455/151.4 |
| 4,408,186 A | 10/1983 | Howell | 340/310 A |
| 4,409,542 A | 10/1983 | Becker et al. | 324/57 Q |
| 4,413,250 A | 11/1983 | Porter et al. | 340/310.01 |
| 4,419,621 A | 12/1983 | Becker et al. | 324/51 |
| 4,433,284 A | 2/1984 | Perkins | 323/361 |
| 4,442,492 A | 4/1984 | Karlsson et al. | 364/464 |
| 4,457,014 A | 6/1984 | Bloy | 381/98 |
| 4,468,792 A | 8/1984 | Baker et al. | 375/45 |
| 4,471,399 A | 9/1984 | Udren | 361/64 |
| 4,473,816 A | 9/1984 | Perkins | 340/310 |
| 4,473,817 A | 9/1984 | Perkins | 340/310 |
| 4,475,209 A | 10/1984 | Udren | 375/4 |
| 4,479,033 A | 10/1984 | Brown et al. | 179/2.51 |
| 4,481,501 A | 11/1984 | Perkins | 340/310 |
| 4,495,386 A | 1/1985 | Brown et al. | 455/402 |
| 4,504,705 A | 3/1985 | Pilloud | 381/77 |
| 4,517,548 A | 5/1985 | Ise et al. | 340/310 R |
| 4,569,045 A | 2/1986 | Schieble et al. | 370/85 |
| 4,599,598 A * | 7/1986 | Komoda et al. | 340/310.02 |
| 4,636,771 A | 1/1987 | Ochs | 340/310.05 |
| 4,638,298 A | 1/1987 | Spiro | 370/392 |
| 4,642,607 A | 2/1987 | Strom et al. | 340/310 |
| 4,644,321 A | 2/1987 | Kennon | 340/310 A |
| 4,652,855 A * | 3/1987 | Weikel | 340/310 |
| 4,668,934 A | 5/1987 | Shuey | 340/310.06 |
| 4,675,648 A | 6/1987 | Roth et al. | 340/310.07 |
| 4,683,450 A | 7/1987 | Max et al. | 333/202 |
| 4,686,382 A | 8/1987 | Shuey | 307/149 |
| 4,686,641 A | 8/1987 | Evans | 364/580 |
| 4,697,166 A | 9/1987 | Warnagiris et al. | 340/310 R |
| 4,701,945 A | 10/1987 | Pedigo | 379/66 |
| 4,724,381 A | 2/1988 | Crimmins | 324/127 |
| 4,745,391 A | 5/1988 | Gajjar | 340/310 A |
| 4,746,897 A | 5/1988 | Shuey | 340/310 R |
| 4,749,992 A | 6/1988 | Fitzmeyer et al. | 340/870.02 |
| 4,766,414 A | 8/1988 | Shuey | 340/310 A |
| 4,772,870 A | 9/1988 | Reyes | 340/310 R |
| 4,785,195 A | 11/1988 | Rochelle et al. | 307/18 |
| 4,800,363 A | 1/1989 | Braun et al. | 340/310 A |
| 4,815,106 A | 3/1989 | Propp et al. | 375/257 |
| 4,835,517 A | 5/1989 | van der Gracht et al. | 340/310 A |
| 4,890,089 A | 12/1989 | Shuey | 340/310.07 |
| 4,903,006 A | 2/1990 | Boomgaard | 340/310 A |
| 4,904,996 A | 2/1990 | Fernandes | 340/870.07 |
| 4,912,553 A | 3/1990 | Pal et al. | 358/86 |
| 4,962,496 A | 10/1990 | Vercellotti et al. | 370/204 |
| 4,973,940 A | 11/1990 | Sakai et al. | 340/310 R |
| 4,979,183 A | 12/1990 | Cowart | 375/142 |
| 5,006,846 A | 4/1991 | Granville et al. | 340/870.28 |
| 5,066,939 A | 11/1991 | Mansfield, Jr. | 340/310 R |
| 5,068,890 A | 11/1991 | Nilssen | 379/90 |
| 5,132,992 A | 7/1992 | Yurt et al. | 375/240 |
| 5,148,144 A | 9/1992 | Sutterlin et al. | 340/310 A |
| 5,151,838 A | 9/1992 | Dockery | 340/310 R |
| 5,185,591 A | 2/1993 | Shuey | 340/310 A |
| 5,191,467 A | 3/1993 | Kapany et al. | 359/341 |
| 5,210,519 A | 5/1993 | Moore | 340/310 |
| 5,257,006 A | 10/1993 | Graham et al. | 340/310 A |
| 5,264,823 A | 11/1993 | Stevens | 340/310.04 |
| 5,272,462 A | 12/1993 | Teyssandier et al. | 340/310.01 |
| 5,301,208 A | 4/1994 | Rhodes | 375/36 |
| 5,319,634 A | 6/1994 | Bartholomew et al. | 370/18 |
| 5,341,265 A | 8/1994 | Westrom et al. | 361/44 |
| 5,351,272 A | 9/1994 | Abraham | 375/38 |
| 5,355,109 A | 10/1994 | Yamazaki | 336/92 |
| 5,359,625 A | 10/1994 | Vander Mey et al. | 375/1 |
| 5,369,356 A | 11/1994 | Kinney et al. | 324/142 |
| 5,375,141 A | 12/1994 | Takahashi | 375/1 |
| 5,406,249 A | 4/1995 | Pettus | 340/310.06 |
| 5,410,720 A | 4/1995 | Osterman | 725/150 |
| 5,426,360 A | 6/1995 | Maraio et al. | 324/126 |
| 5,432,841 A | 7/1995 | Rimer | 455/457 |
| 5,448,229 A | 9/1995 | Lee, Jr. | 340/870.02 |
| 5,461,629 A | 10/1995 | Sutterlin et al. | 371/30 |
| 5,477,091 A | 12/1995 | Fiorina et al. | 307/66 |
| 5,481,249 A | 1/1996 | Sato | 340/2.1 |
| 5,485,040 A | 1/1996 | Sutterlin | 307/3 |
| 5,497,142 A | 3/1996 | Chaffanjon | 340/310.06 |
| 5,498,956 A | 3/1996 | Kinney et al. | 324/142 |
| 4,749,992 A | 6/1996 | Fitzmeyer et al. | 340/870.02 |
| 5,533,054 A | 7/1996 | DeAndrea et al. | 375/286 |
| 5,537,087 A | 7/1996 | Naito | 336/92 |
| 5,559,377 A | 9/1996 | Abraham | 307/104 |
| 5,568,185 A | 10/1996 | Yoshikazu | 348/22 |
| 5,579,221 A | 11/1996 | Mun | 364/188 |
| 5,579,335 A | 11/1996 | Sutterlin et al. | 375/200 |
| 5,592,354 A | 1/1997 | Nocentino, Jr. | 361/69 |
| 5,592,482 A | 1/1997 | Abraham | 348/8 |
| 5,598,406 A | 1/1997 | Albrecht et al. | 370/296 |
| 5,616,969 A | 4/1997 | Morava | 307/91 |
| 5,625,863 A | 4/1997 | Abraham | 455/3.3 |
| 5,630,204 A | 5/1997 | Hylton et al. | 455/3.3 |
| 5,640,416 A | 6/1997 | Chalmers | 375/147 |
| 5,664,002 A | 9/1997 | Skinner, Sr. | 379/56.2 |
| 5,684,450 A | 11/1997 | Brown | 340/310.02 |
| 5,691,691 A | 11/1997 | Merwin et al. | 340/310.02 |
| 5,694,108 A | 12/1997 | Shuey | 340/310.01 |
| 5,705,974 A | 1/1998 | Patel et al. | 340/310.08 |
| 5,712,614 A | 1/1998 | Patel et al. | 340/310.03 |

| | | | |
|---|---|---|---|
| 5,717,685 A | 2/1998 | Abraham | 370/30 |
| 5,726,980 A | 3/1998 | Rickard | 370/293 |
| 5,748,104 A | 5/1998 | Argyroudis et al. | 340/870.11 |
| 5,748,671 A | 5/1998 | Sutterlin et al. | 375/206 |
| 5,751,803 A | 5/1998 | Shpater | 379/379 |
| 5,770,996 A | 6/1998 | Severson et al. | 340/310.08 |
| 5,774,526 A | 6/1998 | Propp et al. | 379/90.1 |
| 5,777,544 A | 7/1998 | Vander Mey et al. | 340/310.06 |
| 5,777,545 A | 7/1998 | Patel et al. | 341/310.06 |
| 5,777,769 A | 7/1998 | Coutinho | 359/173 |
| 5,778,116 A | 7/1998 | Tomich | 385/16 |
| 5,796,607 A | 8/1998 | Le Van Suu | 364/140.01 |
| 5,798,913 A | 8/1998 | Tiesinga et al. | 363/21.13 |
| 5,801,643 A | 9/1998 | Williams et al. | 340/870.02 |
| 5,802,102 A | 9/1998 | Davidovici | 375/152 |
| 5,805,053 A | 9/1998 | Patel et al. | 340/310.01 |
| 5,805,458 A | 9/1998 | McNamara et al. | 702/60 |
| 5,818,127 A | 10/1998 | Abraham | 307/106 |
| 5,818,821 A * | 10/1998 | Schurig | 370/293 |
| 5,828,293 A | 10/1998 | Rickard | 340/310.04 |
| 5,835,005 A | 11/1998 | Furukawa et al. | 340/310.01 |
| 5,847,447 A | 12/1998 | Rozin et al. | 257/678 |
| 5,850,114 A | 12/1998 | Froidevaux | 307/105 |
| 5,856,776 A | 1/1999 | Armstrong et al. | 340/310.01 |
| 5,864,284 A | 1/1999 | Sanderson | 340/310.01 |
| 5,870,016 A * | 2/1999 | Shresthe | 340/310.01 |
| 5,880,677 A | 3/1999 | Lestician | 340/825.06 |
| 5,881,098 A | 3/1999 | Tzou | 375/152 |
| 5,892,430 A | 4/1999 | Wiesman et al. | 340/310.01 |
| 5,892,758 A | 4/1999 | Argyroudis | 370/335 |
| 5,929,750 A | 7/1999 | Brown | 340/310.02 |
| 5,933,071 A | 8/1999 | Brown | 340/310.01 |
| 5,933,073 A | 8/1999 | Shuey | 340/310.07 |
| 5,937,003 A | 8/1999 | Sutterlin et al. | 375/208 |
| 5,937,342 A | 8/1999 | Kline | 455/402 |
| 5,949,327 A | 9/1999 | Brown | 340/310.01 |
| 5,952,914 A | 9/1999 | Wynn | 340/310.01 |
| 5,963,585 A | 10/1999 | Omura et al. | 375/207 |
| 5,977,650 A | 11/1999 | Rickard et al. | 307/3 |
| 5,978,371 A | 11/1999 | Mason, Jr. et al. | 370/389 |
| 5,982,276 A | 11/1999 | Stewart | 340/310.01 |
| 5,994,998 A | 11/1999 | Fisher et al. | 340/310.01 |
| 5,994,999 A | 11/1999 | Ebersohl | 340/310.01 |
| 6,014,386 A | 1/2000 | Abraham | 370/485 |
| 6,023,106 A | 2/2000 | Abraham | 307/3 |
| 6,037,678 A | 3/2000 | Rickard | 307/89 |
| 6,037,857 A | 3/2000 | Behrens et al. | 340/310.03 |
| 6,040,759 A | 3/2000 | Sanderson | 340/310.01 |
| 6,091,932 A | 7/2000 | Langlais | 455/5.1 |
| 6,104,707 A | 8/2000 | Abraham | 370/295 |
| 6,121,765 A | 9/2000 | Carlson | 323/359 |
| 6,130,896 A | 10/2000 | Lueker et al. | 370/469 |
| 6,140,911 A * | 10/2000 | Fisher et al. | 340/310.01 |
| 6,141,634 A | 10/2000 | Flint et al. | 703/18 |
| 6,144,292 A | 11/2000 | Brown | 340/310.02 |
| 6,151,330 A | 11/2000 | Liberman | 370/449 |
| 6,151,480 A | 11/2000 | Fischer et al. | 340/310.01 |
| 6,154,488 A | 11/2000 | Hunt | 375/219 |
| 6,157,292 A | 12/2000 | Piercy et al. | 340/310.01 |
| 6,172,597 B1 | 1/2001 | Brown | 340/310.02 |
| 6,175,860 B1 | 1/2001 | Gaucher | 709/208 |
| 6,177,849 B1 | 1/2001 | Barsellotti et al. | 333/177 |
| 6,212,658 B1 | 4/2001 | Le Van Suu | 714/749 |
| 6,226,166 B1 | 5/2001 | Gumley et al. | 361/118 |
| 6,229,434 B1 | 5/2001 | Knapp et al. | 340/310.01 |
| 6,239,722 B1 * | 5/2001 | Colton et al. | 340/870.02 |
| 6,243,413 B1 | 6/2001 | Beukema | 375/222 |
| 6,243,571 B1 | 6/2001 | Bullock et al. | 455/402 |
| 6,255,805 B1 | 7/2001 | Papalia et al. | 323/207 |
| 6,255,935 B1 | 7/2001 | Lehmann et al. | 340/310.07 |
| 6,275,144 B1 | 8/2001 | Rumbaugh | 340/310.01 |
| 6,282,405 B1 | 8/2001 | Brown | 725/79 |
| 6,297,729 B1 * | 10/2001 | Abali et al. | 340/310.01 |
| 6,297,730 B1 | 10/2001 | Dickinson | 340/310.01 |
| 6,300,881 B1 | 10/2001 | Yee et al. | 340/870.02 |
| 6,313,738 B1 | 11/2001 | Wynn | 340/310.03 |
| 6,317,031 B1 | 11/2001 | Rickard | 340/310.03 |
| 6,331,814 B1 | 12/2001 | Albano et al. | 340/310.01 |
| 6,335,672 B1 | 1/2002 | Tumlin et al. | 336/175 |
| 6,373,376 B1 | 4/2002 | Adams et al. | 340/310.01 |
| 6,384,580 B1 | 5/2002 | Ochoa et al. | 323/207 |
| 6,396,391 B1 * | 5/2002 | Binder | 340/310.01 |
| 6,396,392 B1 | 5/2002 | Abraham | 340/310.01 |
| 6,404,773 B1 | 6/2002 | Williams et al. | 370/463 |
| 6,407,987 B1 | 6/2002 | Abraham | 370/295 |
| 6,414,578 B1 | 7/2002 | Jitaru | 336/170 |
| 6,425,852 B1 | 7/2002 | Epstein et al. | 600/13 |
| 6,441,723 B1 | 8/2002 | Mansfield, Jr. et al. | 340/310.01 |
| 6,449,318 B1 | 9/2002 | Rumbaugh | 375/309 |
| 6,452,482 B1 | 9/2002 | Cern | 340/310.01 |
| 6,480,510 B1 * | 11/2002 | Binder | 370/502 |
| 6,486,747 B1 | 11/2002 | DeCramer et al. | 333/25 |
| 6,492,897 B1 | 12/2002 | Mowery, Jr. | 340/310.01 |
| 6,496,104 B2 | 12/2002 | Kline | 340/310.01 |
| 6,504,357 B1 | 1/2003 | Hemminger et al. | 340/310.01 |
| 6,507,573 B1 | 1/2003 | Brandt et al. | 370/335 |
| 6,515,485 B1 | 2/2003 | Bullock et al. | 324/601 |
| 6,522,626 B1 | 2/2003 | Greenwood | 370/208 |
| 6,522,650 B1 | 2/2003 | Yonge, III et al. | 370/390 |
| 6,549,120 B1 | 4/2003 | De Buda | 340/310.01 |
| 6,590,493 B1 | 7/2003 | Rasimas et al. | 340/310.01 |
| 6,611,134 B2 | 8/2003 | Chung | 324/74 |
| 6,646,447 B2 | 11/2003 | Cern et al. | 324/539 |
| 6,650,249 B2 | 11/2003 | Meyer et al. | 340/870.02 |
| 6,667,685 B2 | 12/2003 | Wasaki et al. | 340/310.03 |
| 6,668,058 B2 | 12/2003 | Grimes | 379/322 |
| 6,686,832 B2 | 2/2004 | Abraham | 340/310.01 |
| 6,785,532 B1 | 8/2004 | Rickard | 455/402 |
| 6,785,592 B1 | 8/2004 | Smith et al. | 700/291 |
| 6,788,745 B1 | 9/2004 | Lim et al. | 375/297 |
| 2001/0038329 A1 | 11/2001 | Diamanti et al. | 340/310.01 |
| 2001/0038343 A1 | 11/2001 | Meyer et al. | 340/870.02 |
| 2001/0052843 A1 | 12/2001 | Wiesman et al. | 340/310.01 |
| 2001/0054953 A1 | 12/2001 | Kline | 340/310.01 |
| 2002/0010870 A1 | 1/2002 | Gardner | 713/300 |
| 2002/0014884 A1 | 2/2002 | Chung | 324/74 |
| 2002/0027496 A1 | 3/2002 | Cern et al. | 340/310.01 |
| 2002/0041228 A1 | 4/2002 | Zhang | 340/310.01 |
| 2002/0060624 A1 | 5/2002 | Zhang | 340/310.01 |
| 2002/0071452 A1 | 6/2002 | Abraham | 370/480 |
| 2002/0080010 A1 | 6/2002 | Zhang | 340/310.06 |
| 2002/0095662 A1 | 7/2002 | Ashlock et al. | 717/136 |
| 2002/0098867 A1 | 7/2002 | Meiksen et al. | 455/560 |
| 2002/0105413 A1 | 8/2002 | Cern | |
| 2002/0140547 A1 | 10/2002 | Litwin, Jr. et al. | 340/310.01 |
| 2002/0171535 A1 | 11/2002 | Cern | 340/310.07 |
| 2003/0062990 A1 | 4/2003 | Schaeffer, Jr. et al. | 340/310.01 |
| 2003/0067910 A1 | 4/2003 | Razazian et al. | 370/352 |
| 2003/0090368 A1 | 5/2003 | Ide | 340/310.06 |
| 2003/0103307 A1 | 6/2003 | Dostert | 361/113 |
| 2003/0107477 A1 | 6/2003 | Ide | 340/310.01 |
| 2003/0149784 A1 | 8/2003 | Ide | 709/231 |
| 2003/0232599 A1 | 12/2003 | Dostert | 455/66.1 |

FOREIGN PATENT DOCUMENTS

| | | |
|---|---|---|
| DE | 101 00 181 A1 | 7/2002 |
| DE | 100 59 564 A1 | 9/2002 |
| DE | 100 48 348 C2 | 11/2002 |
| DE | 100 26 930 C2 | 1/2003 |
| DE | 100 26 931 C2 | 1/2003 |
| DE | 100 42 958 C2 | 1/2003 |
| EP | 0 141 673 A2 | 5/1985 |

| | | | |
|---|---|---|---|
| EP | 0 581 351 A1 | 2/1994 |
| EP | 0 632 602 A2 | 1/1995 |
| EP | 0 470 185 B1 | 11/1995 |
| EP | 0 822 721 A3 | 2/1998 |
| EP | 0 822 721 A2 | 2/1998 |
| EP | 0 913 955 A2 | 5/1999 |
| EP | 0 933 883 A2 | 8/1999 |
| EP | 0 933 883 A3 | 8/1999 |
| EP | 0 948 143 A2 | 10/1999 |
| EP | 0 959 569 A1 | 11/1999 |
| EP | 1 011 235 A2 | 6/2000 |
| EP | 1 014 640 A2 | 6/2000 |
| EP | 1 043 866 A3 | 10/2000 |
| EP | 1 043 866 A2 | 10/2000 |
| EP | 1 075 091 A1 | 2/2001 |
| EP | 0 916 194 B1 | 9/2001 |
| EP | 1 011 235 A3 | 5/2002 |
| EP | 1 213 849 A1 | 6/2002 |
| EP | 1 217 760 A1 | 6/2002 |
| EP | 1 014 640 A3 | 7/2002 |
| EP | 1 021 866 B1 | 10/2002 |
| ES | 2 122 920 A1 | 12/1998 |
| FR | 2 326 087 | 7/1976 |
| GB | 1 548 652 | 7/1979 |
| GB | 2 101 857 A | 1/1983 |
| GB | 2 293 950 A | 4/1996 |
| GB | 2 315 937 A | 2/1998 |
| GB | 2 331 683 A | 5/1999 |
| GB | 2 335 335 A | 9/1999 |
| GB | 2 341 776 A | 3/2000 |
| GB | 2 342 264 A | 4/2000 |
| GB | 2 347 601 A | 9/2000 |
| JP | 1276933 | 11/1989 |
| NZ | 276741 | 7/1998 |
| WO | 84/01481 A1 | 4/1984 |
| WO | 90/13950 A2 | 11/1990 |
| WO | 92/16920 A1 | 10/1992 |
| WO | 93/07693 A1 | 4/1993 |
| WO | 95/29536 | 11/1995 |
| WO | 98/01905 A1 | 1/1998 |
| WO | 98/33258 A3 | 7/1998 |
| WO | WO 98/33258 | 7/1998 |
| WO | 98/33258 A2 | 7/1998 |
| WO | 98/40980 A1 | 9/1998 |
| WO | 99/59261 A1 | 11/1999 |
| WO | 00/16496 A2 | 3/2000 |
| WO | 00/59076 A1 | 10/2000 |
| WO | 00/60701 A1 | 10/2000 |
| WO | 00/60822 A1 | 10/2000 |
| WO | 01/08321 A1 | 2/2001 |
| WO | 01/43305 A1 | 6/2001 |
| WO | 01/50625 A2 | 7/2001 |
| WO | 01/50625 A3 | 7/2001 |
| WO | 01/50628 A1 | 7/2001 |
| WO | 01/50629 A1 | 7/2001 |
| WO | 01/63787 A1 | 8/2001 |
| WO | 01/82497 A1 | 11/2001 |
| WO | 02/17509 A1 | 2/2002 |
| WO | 02/37712 A1 | 5/2002 |
| WO | 02/054605 A1 | 7/2002 |

OTHER PUBLICATIONS

U.S. Appl. No. 10/075,708, filed Feb. 14, 2002, Kline.

U.S. Appl. No. 10/075,332, filed Feb. 14, 2002, Kline.

U.S. Appl. No. 10/150,694, filed May 16, 2002, Gidge.

U.S. Appl. No. 10/165,992, filed Jun. 10, 2002, Kline.

U.S. Appl. No. 10/176,500, filed Jun. 21, 2002, Pridmore, Jr. et al.

Web Printout: http://www.tohoku–epco.co.jp/profil/kurozu/c_vol8_1/art04.htm Tohoku Electric Power, Co., Inc., "Tohoku Electric Develops High–Speed Communications System Using Power Distribution Lines," *Tohoku Currents*, Spring 1998, 8(1) , 2 pages.

International Search Report issued in PCT Application No. PCT/US01/01810, Date of Mailing: May 2, 2001.

International Search Report issued in PCT Application No. PCT/US01/12699, Date of Mailing: Jul. 16, 2001.

International Search Report issued in PCT Application No. PCT/US01/12291, Date of Mailing: Oct. 22, 2001.

International Search Report issued in PCT Application No. PCT/US01/48064, Date of Mailing: Jun. 5, 2002.

Written Opinion issued in PCT Application No. PCT/US01/12699, Date of Mailing: May 15, 2002.

International Search Report issued in PCT Application No. PCT/US02/04310, Date of Mailing: Jun. 24, 2002.

U.S. Appl. No. 10/293,799, filed Nov. 13, 2002, Huebner.

U.S. Appl. No. 10/292,745, filed Nov. 12, 2002, Cope et al.

U.S. Appl. No. 10/292,714, filed Nov. 12, 2002, Cope.

U.S. Appl. No. 10/315,725, filed Dec. 10, 2002, Cope et al.

U.S. Appl. No. 10/319,317, filed Dec. 13, 2002, Mollenkopf et al.

Power Line Communications Conference entitled, "PLC, A New Competitor in Broadband Internet Access," Dec. 11–12, 2001, Washington, D.C., 60 pages.

Rivkin, S. R., "Co–Evolution of Electric & Telecommunications Networks," *The Electricity Journal*, May 1998, 71–76.

Marketing Assessment Presentation entitled "Powerline Telecommunications," The Shpigler Group for CITI PLT, Jul. 16, 2002, 9 pages.

Campbell, C., presentation entitled "Building a Business Case for PLC: Lessons Learned From the Communication Industry Trenches," KPMG Consulting, Jul. 16, 2002, 5 pages.

"Embedded Power Line Carrier Modem," Archnet Electronic Technology, http://www.archnetco.com/english/product/ATL90.htm, 2001, 3 pages.

"Archnet: Automatic Meter Reading System Power Line Carrier Communication", www.archnetco.com/english/product/product_sl.htm, 3 pages.

"Power Line Communications Solutions", www.echelon.com/products/oem/transceivers/powerline/default.htm, 2 pages.

"Texas Instruments: System Block Diagrams: Power Line Communication (Generic)", http://focus.ti.com/docs/apps/catalog/resources/blockdiagram.jhtml?bdId=638, 1 page.

Feduschak, N.A., "Waiting in the Wings: Is Powerline Technology Ready to Compete with Cable?", Mar. 2001, www.cabletoday.com/ic2/archives/0301/0301powerline.htm, 5 pages.

"Signalling on Low–Voltage Electrical Installations in the Frequency Band 3kHz to 148.5kHz–Part 4: Filters at the Interface of the Indoor and Outdoor Electricity Network", *CLC SC 105A (Secretariat)* May 1992, 62, 1–11.

"Intellon Corporation Test Summary for Transformerless Coupler Study", *Intellon No News Wires*, Dec. 24, 1998, DOT/NHTSA Order No. DTNH22–98–P–07632, pp 1–18.

EMETCON *Automated Distribution System*, ABB Power T & D Company, Inc., Jan. 1990, Raleigh, North Carolina, No. B–919A, 14 pages.

"Dedicated Passive Backbone for Power Line Communcations", *IBM Technical Disclosure Bulletin*, Jul. 1997, 40(7), 183–185.

Coaxial Feeder Cables [Engineering Notes], *PYE Telecommunications Limited Publication Ref No. TSP507/1*, Jun. 1975, Cambridge, England, 15 pages.

"Centralized Commercial Building Applications with the Lonworks ® PLT–21 Power Line Transceiver", *Lonworks Engineering Bulletin*, Echelon, Apr. 1997, pp 1–22.

Plexeon Logistics, Inc., "Power Line Communications", www.plexeon.com/power.html, 2 pages.

"EMETCON Automated Distribution System: Communications Guide", *Westinghouse ABB Power T & D Company Technical Manual 42–6001A*, Sep. 1989, 55 pages.

Abraham, K.C. et al., "A Novel High–Speed PLC Communication Modem", *IEEE Transactions on Power Delivery*, 1992, 7(4), 1760–1768.

J.M. Barstow., "A Carrier Telephone System for Rural Service", *AIEE Transactions*, 1947, 66, 301–307.

Chang, S.S.L., "Power–Line Carrier", *Fundamentals Handbook of Electrical and Computer Engineering*, Volume II–Communication, Control, Devices and Systems, John Wiley & Sons, 617–627.

Chen, Y–F. et al. "Baseband Transceiver Design of a 128–Kbps Power–Line Modem for Household Applications", *IEEE Transactions on Power Delivery*, 2002, 17(2), 338–344.

Coakley, N.G. et al., "Real–Time Control of a Servosytem Using the Inverter–Fed Power Lines to Communicate Sensor Feedback", *IEEE Transactions on Industrial Electronics*, 1999, 46(2), 360–369.

Esmailian, T. et al., "A Discrete Multitone Power Line Communication System", *Department of Electrical and Computer Engineering*, University of Toronto, Ontario Canada, 2000 IEEE, pp 2953–2956.

Kawamura, A. et al., "Autonomous Decentralized Manufacturing System Using High–speed Network with Inductive Transmission of Data and Power", *IEEE*, 1996, 940–945.

Kilbourne, B. "EEI Electric Perspectives: The Final Connection", www.eei.org/ep/editorial/Jul–01/0701conenct.htm, 7 pages.

Kim, W–O., et al., "A Control Network Architecture Based on EIA–709.1 Protocol for Power Line Data Communications", *IEEE Transactions on Consumer Electronics*, 2002, 48(3), 650–655.

Lim, C.K. et al., "Development of a Test Bed for High–Speed Power Line Communications", School of Electrical and Electronics Engineering, Nanyang Technological University, Singapore, *IEEE*, 2000, 451–456.

Lokken, G. et al., "The Proposed Wisconsin electric Power Company Load Management System Using Power Line Carrier Over Distribution Lines", *1976 National Telecommunications Conference, IEEE*, 1976, 2.2–12.2–3.

Marthe, E. et al., "Indoor Radiated Emission Associated with Power Line Communication Systems", *Swiss Federal Institute of Technology Power Systems Laboratory IEEE*, 2001, 517–520.

Naredo, J.L. et al., "Design of Power Line Carrier Systems on Multitransposed Delta Transmission Lines", *IEEE Transactions on Power Delivery*, 1991, 6(3), 952–958.

Nichols, K., "Build a Pair of Line–Carrier Modems", *CRC Electronics–Radio Electronics*, 1988, 87–91.

Okazaki, H, et al., "A Transmitting, and Receiving Method for CDMA Communications Over Indoor Electrical Power Lines", *IEEE*, 1998, pp VI–522–VI–528.

B. Don Russell, "Communication Alternatives for Distribution Metering and Load Management", *IEEE Transactions on Power Apparatus and Systems*, 1980, Vol PAS–99(4), 1448–1455.

Sado, WN et al., "Personal Communication on Residential Power Lines– Assessment of Channel Parameters", *IEEE*, 532–537.

International Search Report dated Aug. 7, 2002, from PCT/US02/04300.

U.S. Appl. No. 10/625,280, filed Jul. 23, 2003, Corcoran.

U.S. Appl. No. 10/348,164, filed Jan. 21, 2003, Cope et al.

U.S. Appl. No. 10/385, 899, filed Mar. 10, 2003, Mollenkopf.

U.S. Appl. No. 10/436,778, filed May 13, 2003, Giannini et al.

U.S. Appl. No. 10/434,024, filed May 8, 2003, Corcoran et al.

LONWORKS Engineering Bulletin, "Demand Side Management with LONWORKS® Power Line Transceivers," Dec. 1996, 36 pages.

LONWORKS Engineering Bulletin, "Centralized Commercial Building Applications with the LONWORKS® PLT–21 Power Line Transceiver," Apr. 1997, 22 pages.

HomePlug™Powerline Alliance, HomePlug Initital Draft Medium Interface Specification, May 19, 2000, 109 pages.

HomePlug™Powerline Alliance, HomePlug 0.5 Draft Medium Interface Specification, Nov. 28, 2000, 133 pages.

HomePlug™Powerline Alliance, HomePlug Initital Draft Medium Interface Specification, Jul. 27, 2000, 109 pages.

HomePlug™Powerline Alliance, HomePlug 1.01 Specification, Dec. 1, 2001, 139 pages.

Summary of an IEEE Guide for Power–Line Carrier Applications, A Report by the Power System Communications Committee, *IEEE Transactions on Power Apparatus and Systems*, vol. PAS–99, No. 6, Nov./Dec. 1980.

De Wilde, W. R. et al., "Upwards to a Reliable Bi–Directional Communication Link on the LV Power Supplies for Utility Services: Field Tests in Belgium," pp. 168–172.

Tanaka, M., "Transmission Characteristics of a Power Line Used for Data Communications at High Frequencies," *IEEE Transactions on Consumer Electronics*, Feb. 1989, vol. 35, No. 1, pp. 37–42.

Hasler, E. F. et al., "Communication Systems Using Bundle Conductor Overhead Power Lines," *IEEE Transactions on Power Apparatus and Systems*, Mar./Apr. 1975, vol. PAS–94, No. 2, pp. 344–349.

IEEE Guide for Power–Line Carrier Applications, ANSI/IEEE Std 643–1980, © 1980 by The Institute of Electrical and Electronics Engineers, Inc., pp. 1–80.

Hatori, M. et al., "Home Informatization and Standization of Home Bus," *IEEE Transactions on Consumer Electronics*, Aug. 1986, vol. CE–32, No. 3, pp. 542–549.

Hunt, J. M. et al., "Electrical Energy Monitoring and Control System for the Home," *IEEE Transactions on Consumer Electronics*, Aug. 1986, vol. CE–32, No. 3, pp. 578–583.

Gutzwiller, F. W. et al., "Homenet: A Control Network for Consumer Applications," *IEEE Transactions on Consumer Electronics*, Aug. 1983, vol. CE–29, No. 3, pp. 297–304.

Burrascano, P. et al., "Digital Signal Transmission on Power Line Carrier Channels: An Introduction," *IEEE Transactions on Power Delivery*, Jan. 1987, vol. PWRD–2, No. 1, pp. 50–56.

Burr, A. G. et al., "Effect of HF Broadcast Interference on PowerLine Telecommunications Above 1 Mhz," © 1998 IEEE, pp. 2870–2875.

Onunga, J. et al., "Distribution Line Communications Using CSMA Access Control with Priority Acknowledgements," *IEEE Transactions on Power Delivery*, Apr. 1989, vol. 4, No. 2, pp. 878–886.

Tanaka, M., "High Frequency Noise Power Spectrum, Impedance and Transmission Loss of Power Line in Japan on Intrabuilding Power Line Communications," *IEEE Transactions on Consumer Electronics*, May 1988, vol. 34, No. 2, pp. 321–326.

Meng, H. et al., "A Transmission Line Model for High–Frequency Power Line Communication Channel," ©2002 IEEE, pp. 1290–1295.

Burrascano, P. et al., "Performance Evaluation of Digital Signal Transmission Channels on Coronating Power Lines," © 1988 IEEE, pp. 365–368.

DiClementi, D. A. et al., "Electrical Distribution System Power Line Characterization," © 1996 IEEE, pp. 271–276.

Abraham, K. C. et al., "A Novel High–Speed PLC Communication Modem," *IEEE Transactions on Power Delivery*, Oct. 1992, vol. 7, No. 4, pp. 1760–1768.

Yoshitoshi, M. et al., "Proposed Interface Specifications for Home Bus," *IEEE Transactions on Consumer Electronics*, Aug. 1986, vol. CE–32, No. 3, pp. 550–557.

O'Neal, Jr., J. B., "The Residential Power Circuit as a Communication Medium," IEEE Transactions on Consumer Electronics, Aug. 1986, vol. CE–32, No. 3, pp. 567–577.

Written Opinion dated Aug. 20, 2003, from PCT/US02/04310.

Written Opinion dated Mar. 21, 2003, from PCT/US02/04300.

Dostert, K., "EMC Aspects of High Speed Powerline Communications," Proceedings of the $15^{th}$ International Wroclaw Symposium and Exhibition on Electromagnetic Capability, Jun. 27–30, 2000; Wroclaw, Poland, pp. 98–102.

Piety, R. A., "Intrabuilding Data Transmission Using Power–Line Wiring," Hewlett–Packard Journal, May 1987, pp. 35–40.

Dostert, K., Powerline Communications, Ch. 5, pp. 286, 288–292, Prentice Hall PTR, Upper Saddle River, NJ ©2001.

Liu, E. et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31–Apr. 2, 2004] 6 pages.

* cited by examiner

METHOD OF ISOLATING DATA IN A POWER LINE COMMUNICATIONS NETWORK

CROSS REFERENCE TO RELATED APPLICATIONS

This application claims priority under 35 U.S.C. § 119(e) from provisional application No. 60/177,237, filed Jan. 20, 2000. The 60/177,237 provisional application is incorporated by reference herein, in its entirety, for all purposes.

INTRODUCTION

The present invention relates generally to the field of electrical communications via power lines. More particularly, the present invention relates to isolating data in a power line communications system.

BACKGROUND OF THE INVENTION

A typical electric distribution configuration has a transformer which steps medium voltage down to a few hundred volts AC (typically between 100 and 240 VAC). The Low Voltage (LV) is fed to several homes.

Figure 1:
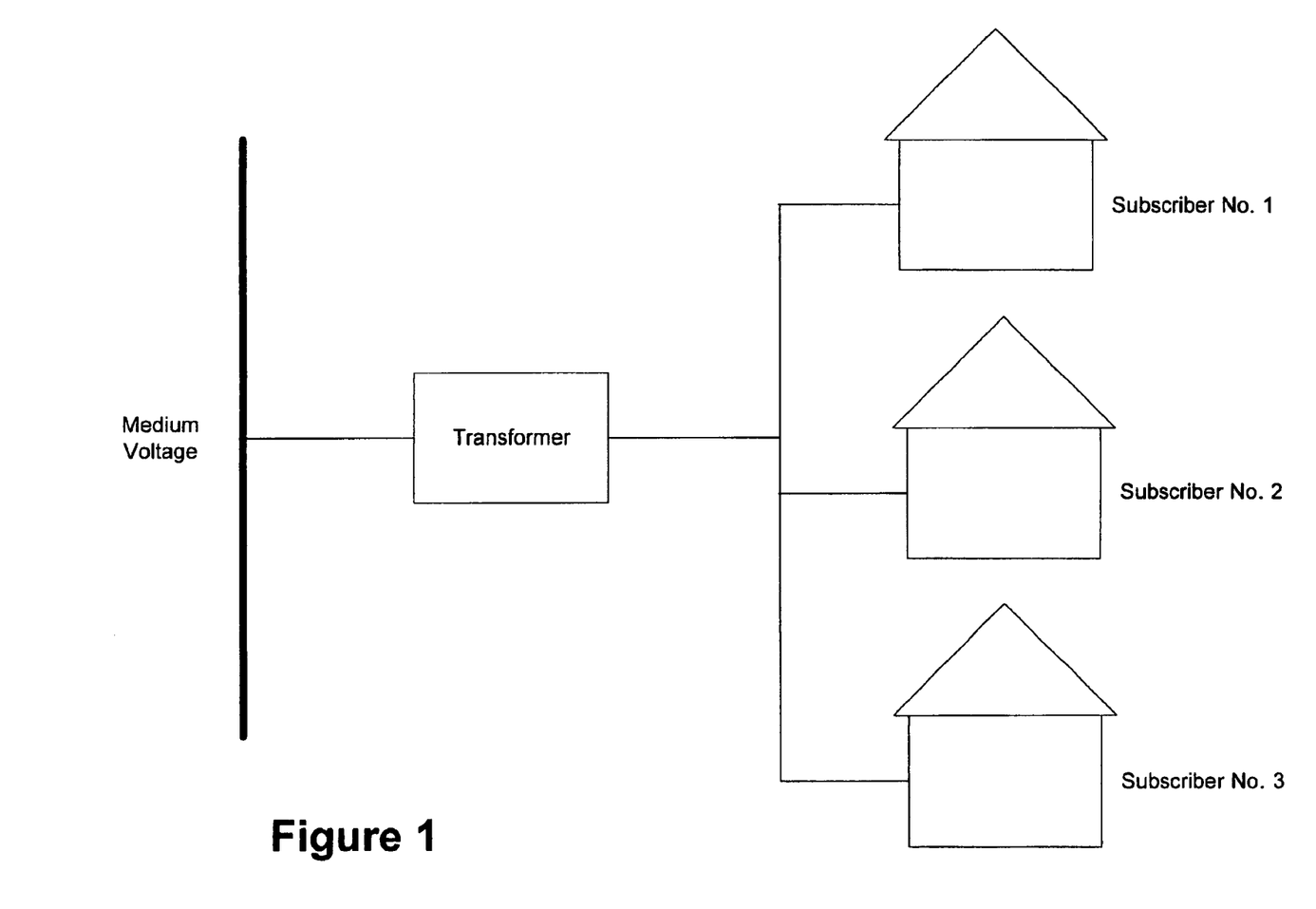
FIG. 1 illustrates a conceptual view of a typical electric distribution topology.

Referring to FIG. 1, the typical electric power distribution architecture is illustrated. No filter or other barrier is employed to isolate data from one residence to the next. Using this architecture for a power line communications system, typically a power line signal containing the data will be fed at the transformer. There are four potential problems with this topology for communications.

First, the bandwidth is shared between plural subscribers. Second, noise from another subscriber using a different type of power line communication system or noise from another subscriber's appliances may cause interference. Third, subscribers using the same system can interact with each other. Fourth, since one subscriber receives the other subscriber's data, there is a lack of security.

Thus, what is needed is a way of isolating data from subscriber to subscriber to alleviate the problems discussed above.

SUMMARY OF THE INVENTION

It is an object of the present invention to enable isolation of data from subscriber to subscriber.

It is another object of the present invention to enable isolation of data from a subscriber to the distribution transformer.

Isolation structures to realize these objects are implemented in a centralized way at the distribution transformer, or alternatively, in a distributed way at each subscriber's premises. These implementations are made using low pass filters (which pass the power but block the data) and power line communications routers or power line communications repeaters.

BRIEF DESCRIPTION OF THE DRAWING

Additional objects and advantages of the present invention will be apparent in the following detailed description read in conjunction with the accompanying drawing figures.

DETAILED DESCRIPTION OF THE INVENTION

According to alternate embodiments, data isolation is accomplished in a centralized manner, in a distributed manner (i.e., at the subscriber), or in a hybrid manner that is a combination of centralized and distributed.

According to one aspect of the invention, a system provides for network communications isolation in a branch line connecting a subscriber device at a subscriber premises to a network. The system includes an electric power distribution transformer, a branch line (connected between the transformer and the subscriber's premises), a low pass filter, and a power line communications router. The low pass filter connected in the branch line at a location adjacent the transformer. The power line communications router is connected to the network and coupled to the branch line at a location adjacent the filter, on the subscriber side of the filter. When the subscriber device is coupled to the branch line, the subscriber device is coupled to the network and is isolated from the transformer by the filter.

According to another aspect of the invention a network coupler. The network coupler provides network communications isolation in a branch line connected to a subscriber premises through an electric power meter. The network coupler includes a low pass filter and a power line communications repeater. The low pass filter is coupled to the branch line adjacent to the power meter. The power line communications repeater is connected to the branch line across the low pass filter.

On the one hand, the power line communications repeater is connected across both the low pass filter and the power meter. In the alternative, the power line communications repeater is connected across only the low pass filter. The low pass filter is disposed either on the subscriber side of the power meter, or on the transformer side of the power meter.

According to yet another aspect of the present invention, a network isolator provides network communications isolation in a branch line connected to a subscriber premises through an electric power meter. The isolation is provided between a network located at the subscriber premises a transformer connected to the branch line. The network isolator includes a low pass filter. The low pass filter is coupled to the branch line adjacent to the power meter. The low pass filter is disposed either on the subscriber side of the power meter, or on the transformer side of the power meter.

Figure 2:
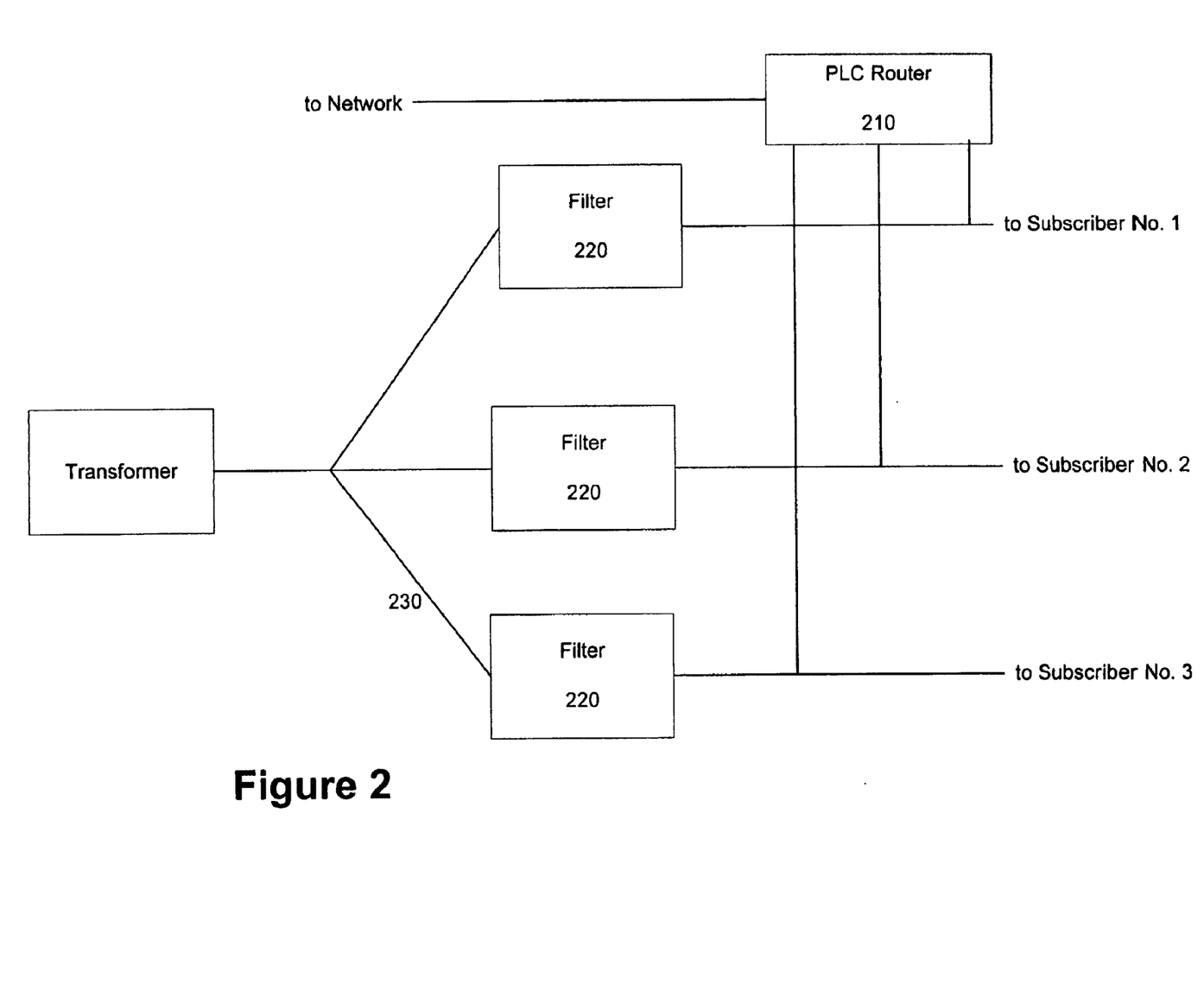
FIG. 2 illustrates a block diagram view of centralized data isolation.

Referring to FIG. 2, a centralized power line communications (PLC) router 210 is illustrated. The centralized PLC router 210 is connected separately to each branch line, which in turn connects to the subscriber. A filter 220 passes the high power electricity (100 VAC to 240 VAC) but blocks the power line communications signal. This filter 220 is implemented using electronic components such as inductors,
} capacitors and resistors. This method requires splicing the electric power line and inserting the filter 210 in series with the line 230.

A less expensive way of implementing this filter, which does not require cutting the power line, uses a ferrite toroid as a common-mode choke. This is done by simply feeding an electric power line through a toroid, thus allowing the electric power (50–60 Hz) to pass yet blocking the higher frequency signals that contain the power line communications data. In most situations the toroid method is preferred.

In conjunction with the centralized method, or as an alternative, data is isolated using a distributed approach. In this approach a filter (such as described above) is placed at the subscriber's location. A power line data repeater, which regenerates the data, is connected in parallel with the filtering device. This topology addresses the noise, interference and security issues. However, the bandwidth is shared between each subscriber connected to the transformer.

Figure 3:
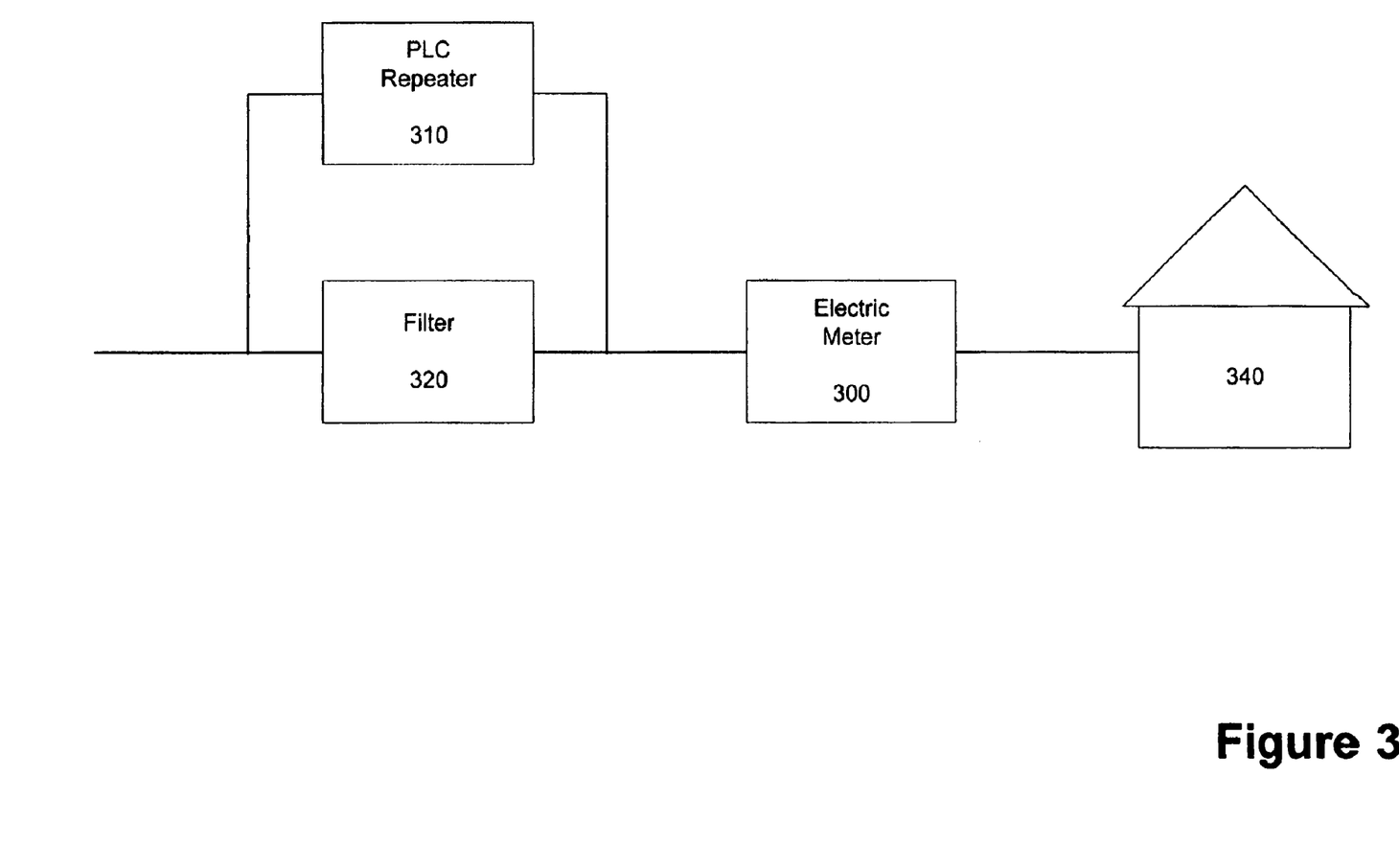
FIG. 3 illustrates a block diagram view of an embodiment of the present invention having isolation before the power meter.

Referring to FIG. 3 a block diagram view of an embodiment of the present invention having isolation before the power meter 300 is illustrated. This is an implementation according to a distributed topology. A PLC repeater 310 and a filter 320 are connected in parallel with one another and in series with the power meter 300. The power meter 300 is disposed between the subscriber's house 340 and the PLC repeater 310.

Figure 4:
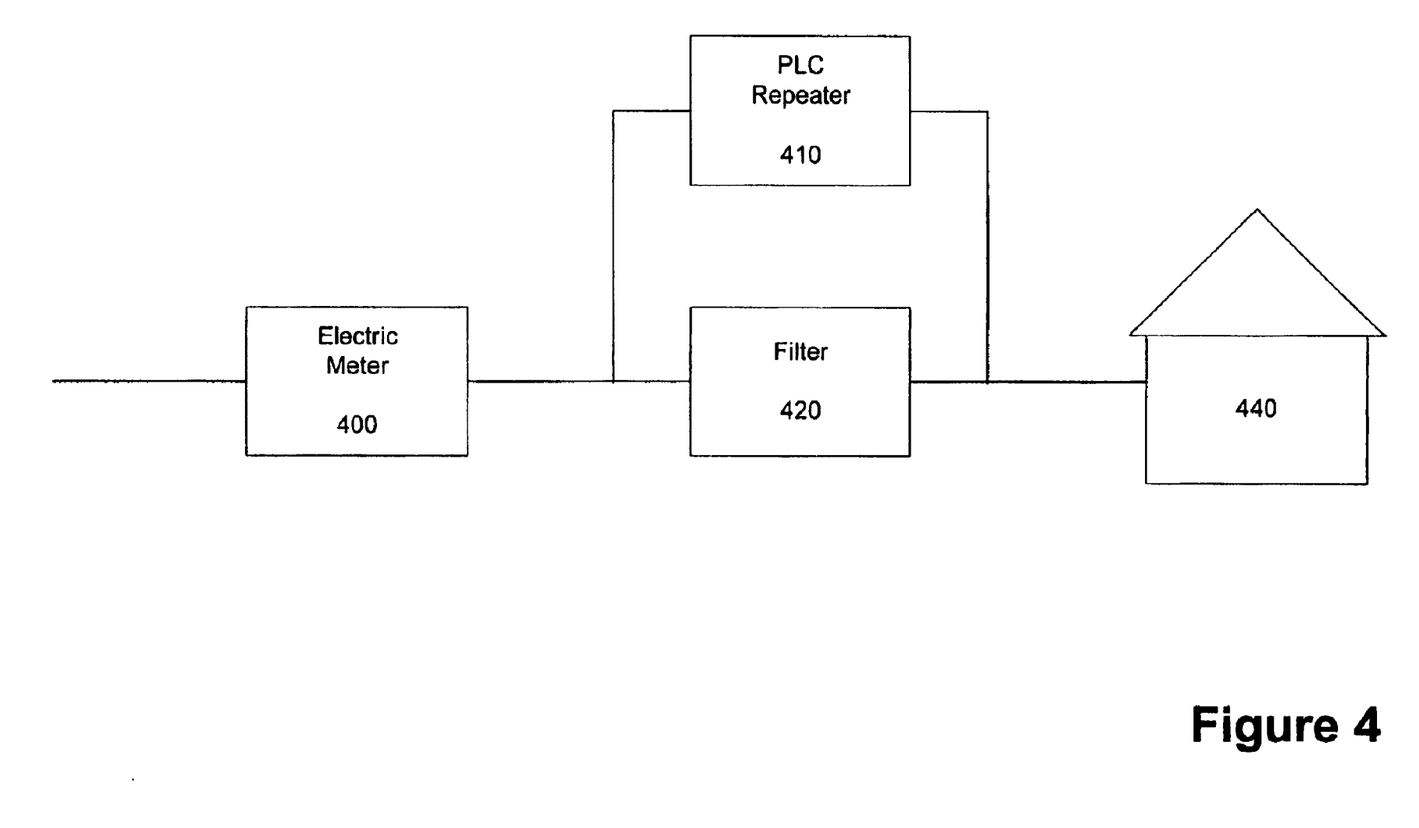
FIG. 4 illustrates a block diagram view of an embodiment of the present invention having isolation after the power meter.

Referring to FIG. 4 a block diagram view of an embodiment of the present invention having isolation after the power meter 400 is illustrated. This is another implementation according to a distributed topology. A PLC repeater 410 and a filter 420 are connected in parallel with one another and in series with the power meter 400. The PLC repeater 410 is disposed between the subscriber's house 440 and the power meter 400.

Functionally, the differences between the distributed topology implementations illustrated in FIGS. 3 & 4 are insubstantial. However, depending on the deployment one may be easier to implement than the other.

Figure 5:
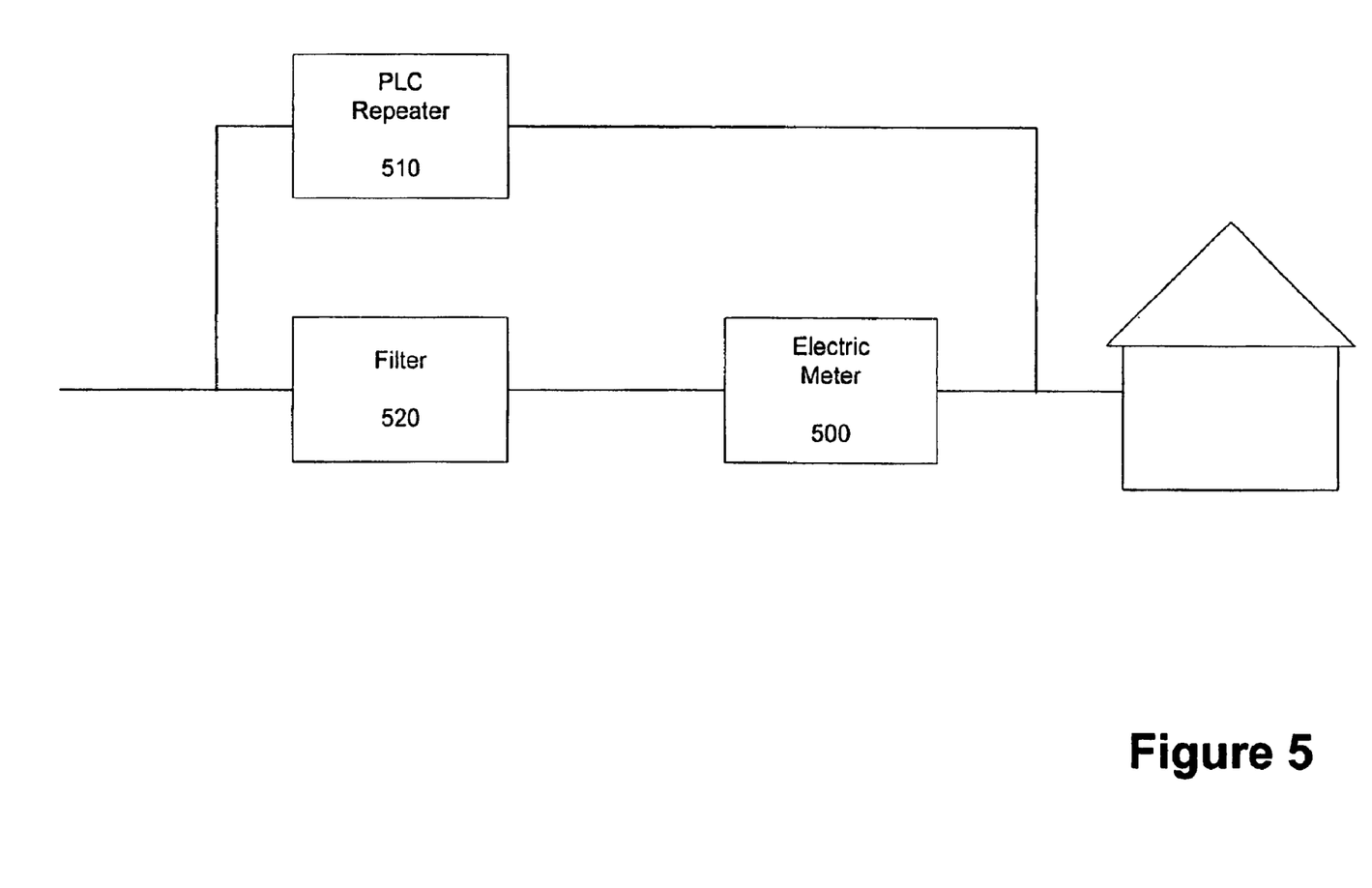
FIG. 5 illustrates a block diagram view of an embodiment of the present invention having isolation bridging the power meter.

Referring to FIG. 5, a block diagram view of an embodiment of the present invention having isolation bridging the power meter is illustrated. A filter 520 is connected in series with the power meter 500, and that series combination is connected in parallel with a PLC repeater 510.

Although the distributed topology of this embodiment is potentially difficult to deploy, it has certain performance advantages. Performance according to this embodiment is superior since the electric meter 500 presents some attenuation of the power line communication signals. Thus, in this topology the PLC repeater 510 repeats signals across the filter 520 and electric meter 500. This achieves a better signal-to-noise ratio by avoiding the attenuation that would otherwise be introduced by the electric meter 500.

Figure 6:
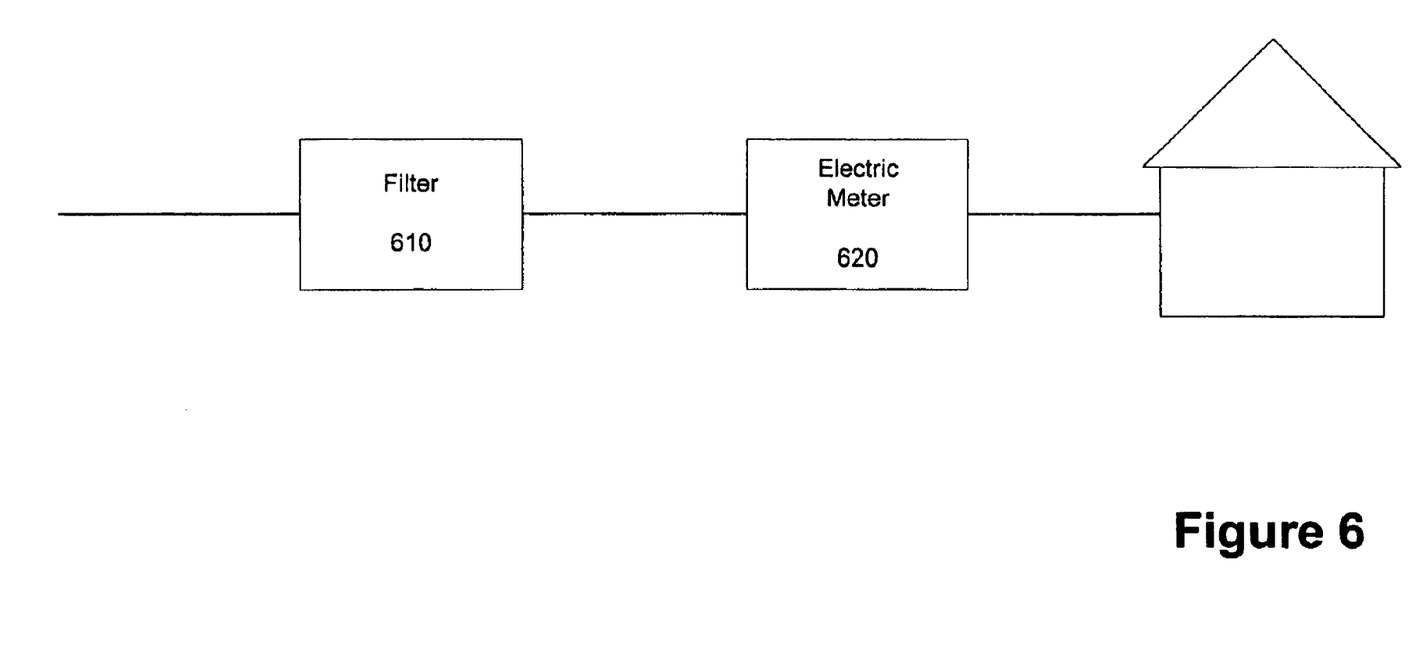
FIG. 6 illustrates a block diagram view of an embodiment of the present invention having a LAN only topology with a filter before the meter.
Figure 7:
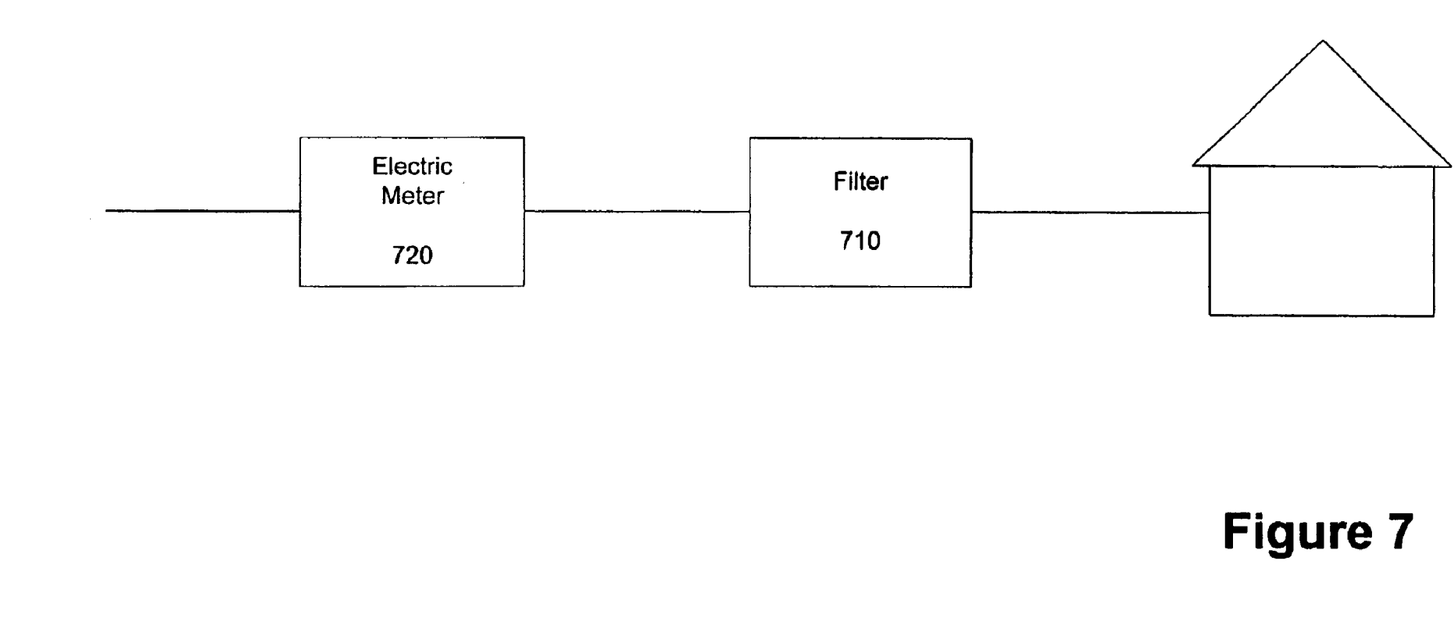
FIG. 7 illustrates a block diagram view of an embodiment of the present invention having a LAN only topology with a filter after the meter

Referring to FIGS. 6 & 7, a filtering device is placed on the power line adjacent the subscriber's premises. This is useful in cases where an internal Local Area Network (LAN) exists within the premises and access to a Wide Area Network (WAN) in not required. This provides security for the LAN as well as reduces interference from the outside. It also isolates the LAN from the WAN in case a WAN is deployed. According to the embodiment illustrated in FIG. 6, the filter 610 and the electric meter 620 are connected in a serial with one another, with the filter 610 before the electric meter 620. Alternatively, FIG. 7 illustrates the filter 710 and the electric meter 720 as being connected in a serial with one another, with the filter 710 placed after the electric meter 720. The arrangement according to both of these illustrated topologies functionally perform the same. However, depending on the deployment one may be easier to implement than the other.

The present invention has been described in terms of preferred embodiments, however, it will be appreciated that various modifications and improvements may be made without departing from the scope of the invention.

What is claimed is:

1. A system for providing network communications to subscriber devices at a plurality of subscriber premises, a branch line connecting each subscriber premises to an electric power distribution transformer, the system comprising:
   a router communicatively coupled to the plurality of branch lines at a node to control data communications for the subscriber premises;
   a plurality of low pass filters with each said low pass filter coupled to a different branch line on the electric power distribution transformer side of the node; and
   wherein each filter prevents the flow of data signals through the branch line and permits the flow of power signals through the branch line.

2. The system of claim 1, wherein said low pass filters each comprise at least two components selected from the following group: capacitor, inductor, and resistor.

3. The system of claim 1, wherein said low pass filters each comprise a common mode choke.

4. The system of claim 1, wherein said low pass filters each comprise a ferrite toroid.

5. A method of providing data communications in a power line communication network that comprises a first branch line connected to a first subscriber premises through an electric power meter and a second branch line connected to a second subscriber premises and to the first branch line, the method comprising:
   establishing a wide area network (WAN) that comprises the first branch line;
   coupling a low pass filter to the first branch line on the first subscriber side of the power meter;
   coupling a first port of a power line communications repeater to the first branch line on a first side of the filter;
   coupling a second port of the power line communications repeater to the first branch line on a second side of the filter; and
   wherein the low pass filter attenuates high frequency noise traversing the first branch line.

6. The method of claim 5, wherein the power line communications repeater is connected across both the low pass filter and the power meter.

7. The method of claim 5, wherein the low pass filter comprises at least two components selected from the following group: capacitor, inductor, and resistor.

8. The method of claim 7, wherein coupling the low pass filter comprises disconnecting the first branch line.

9. The method of claim 5, wherein the low pass filter comprises a common mode choke.

10. The method of claim 5, wherein coupling the low pass filter comprises disposing a ferrite toroid substantially around the circumference of the first branch line.

11. The method of claim 5, wherein the power line communications repeater prevents data transmitted from the second subscriber premises from entering the first subscriber premises.

12. A method of providing data communications in a power line communication network that comprises a first branch line connecting a distribution transformer to a first subscriber premises through an electric power meter and a second branch line connecting a second subscriber premises to the first branch line at a juncture of the first and second branch lines, the method comprising:

coupling a low pass filter to the first branch line between the juncture and the power meter;

coupling a first port of a power line communications repeater to the first branch line on a first side of the filter, coupling a second port of the power line communications repeater to the first branch line on a second side of the filter, establishing a wide area network (WAN) that comprises the first branch line; and wherein the low pass filter attenuates high frequency noise traversing the first branch line.

13. The method of claim 12, wherein the power line communications repeater is connected across both the low pass filter and the power meter.

14. The method of claim 12, wherein the low pass filter comprises at least two components selected from the following group: capacitor, inductor, and resistor.

15. The method of claim 14, wherein coupling the low pass filter comprises disconnecting the first branch line.

16. The method of claim 12, wherein the low pass filter comprises a common mode choke.

17. The method of claim 12, wherein coupling the low pass filter comprises disposing a ferrite toroid substantially around the circumference of the first branch line.

18. The method of claim 12, wherein the power line communications repeater prevents data transmitted from the second subscriber premises from entering the first subscriber premises.

19. A method of isolating data in a power line communication network that comprises a first branch line connected to a first subscriber premises through an electric power meter and a second branch line connecting a second subscriber premises to the first branch line at a juncture of the first and second branch lines, the method comprising:

coupling a low pass filter to the first branch line between the first subscriber premises and the juncture;

coupling a power line communications repeater to the first branch line across both the low pass filter and the power meter;

wherein the low pass filter attenuates the high frequency noise entering the first subscriber premises via the first branch line; and wherein the power line communications repeater prevents data transmitted from the second subscriber premises from entering the first subscriber premises.

20. A method of providing data communications over an electrical distribution system comprising an electrical distribution transformer, the electrical distribution transformer being coupled to a first and second electrical power lines, which are coupled to a first and second subscriber premises, respectively, and wherein said first and second power lines are coupled to each other at a juncture, the method comprising:

coupling a first filter to the first electrical power line between the juncture and the first subscriber premises;

coupling a second filter to the second electrical power line between the juncture and the second subscriber premises, wherein the first and second filters attenuate the flow of data signals through the electrical power line and permit the flow of power signals through the electrical power line;

communicatively coupling a first power line communications repeater to the first electrical power line across the first filter; and communicatively coupling a second power line communications repeater to the second electrical power line across the second filter.

21. The method of claim 20, wherein the first power line communications repeater comprises a router.

22. The method of claim 21, wherein the router is in communication with a plurality of subscribers.

23. The method of claim 20, wherein the first power line communications repeater prevents data associated with a second subscriber from entering the first subscriber premises.

24. The method of claim 20, wherein the first filter is coupled to the first electrical power line on the subscriber side of an electrical power meter.

25. The method of claim 20, wherein the first filter is coupled to the first electrical power line on the electrical transformer side of an electrical power meter.

26. The method of claim 20, wherein the first power line communications repeater is connected across both the first filter and an electrical power meter.

27. The method of claim 20, further comprising communicatively coupling the first power line communications repeater to a data network, and wherein the data network provides data signals.

28. The method of claim 27, wherein the data network is a wide area network.

29. The method of claim 27, wherein the data network is in communication with the first electrical power line on the transformer side of the first filter.

30. The method of claim 20, wherein the first filter is conductively connected to the first electrical power line.

31. The method of claim 20, wherein the first filter is inductively coupled to the first electrical power line.

32. The method of claim 31, wherein the first filter comprises a toroid through which the first electrical power line passes.

33. A method of providing data communications in a power line communication network that comprises a first branch line connected to a first subscriber premises through an electric power meter and a second branch line connected to a second subscriber premises and to the first branch line, the method comprising:

coupling a low pass filter to the first branch line on the first subscriber side of the power meter;

coupling a first port of a power line communications repeater to the first branch line on a first side of the filter;

coupling a second port of the power line communications repeater to the first branch line on a second side of the filter; and wherein the low pass filter comprises a common mode choke that attenuates high frequency noise traversing the first branch line.

34. The method of claim 33, wherein the power line communications repeater is connected across both the low pass filter and the power meter.

35. The method of claim 33, wherein coupling the low pass filter comprises disconnecting the first branch line.

36. The method of claim 33, wherein coupling the low pass filter comprises disposing a ferrite toroid substantially around the circumference of the first branch line.

37. The method of claim 33, wherein the power line communications repeater prevents data transmitted from the second subscriber premises from entering the first subscriber premises.

38. A method of providing data communications in a power line communication network that comprises a first branch line connecting a distribution transformer to a first subscriber premises through an electric power meter and a second branch line connecting a second subscriber premises to the first branch line at a juncture of the first and second branch lines, the method comprising:

coupling a low pass filter to the first branch line between the juncture and the power meter;

coupling a first port of a power line communications repeater to the first branch line on a first side of the filter;

coupling a second port of the power line communications repeater to the first branch line on a second side of the filter; and wherein the low pass filter comprises a common mode choke that attenuates high frequency noise traversing the first branch line.

39. The method of claim 38, wherein the power line communications repeater is connected across both the low pass filter and the power meter.

40. The method of claim 38, wherein coupling the low pass filter comprises disconnecting the first branch line.

41. The method of claim 38, wherein coupling the low pass filter comprises disposing a ferrite toroid substantially around the circumference of the first branch line.

42. The method of claim 38, wherein the power line communications repeater prevents data transmitted from the second subscriber premises from entering the first subscriber premises.

* * * * *

UNITED STATES PATENT AND TRADEMARK OFFICE
CERTIFICATE OF CORRECTION

PATENT NO. : 6,977,578 B2
DATED : December 20, 2005
INVENTOR(S) : Kline

It is certified that error appears in the above-identified patent and that said Letters Patent is hereby corrected as shown below:

Title page,
Item [56], References Cited, U.S. PATENT DOCUMENTS,
"4,053,876" reference, delete "340/253 H" and insert -- 340/529 --.
"5,375,141" reference, delete "12/94" and insert -- 10/94 --.
Delete "4,749,992 A    6/96    Fitzmeyer et al." and insert
-- 4,749,992 B1   6/96    Fitzmeyer et al. --.
"5,864,284" reference, delete "Sanderson" and insert -- Sanderson et al. --.
"6,590,493" reference, delete "Rasimas et al." and insert -- Rasimas --.
OTHER PUBLICATIONS,
"Texas Instruments:" reference, after "Diagrams" delete ":" and insert -- ; --.
"Dedicated Passive Backbone..." reference, delete "Communcations" and insert
-- Communications --.
"Coaxial Feeder Cables..." reference, after "Notes]," insert -- " --.
"Plexeon Logistics, Inc.," reference, insert -- " -- before "Plexeon".
"Chang, S.S.L.," reference, after "Engineering," insert -- " --.
"Lim, C.K. et al.," reference, delete "Electronics" and insert -- Electronic --.
"B. Don Russell," reference, insert -- pp -- before "1448-1455".
"Sado, WN et al.," reference, delete "WN" and insert -- WN. --.
"Hatori, M. et al.," reference, delete "Standization" and insert -- Standardization --.
"DiClementi, D. A. et al.," reference, delete "© 1996" and insert -- ©1996 --.
Item [57], ABSTRACT,
Line 7, after "lines" insert -- is --.

Column 4,
Line 6, after "made" insert -- to the described embodiments --.

UNITED STATES PATENT AND TRADEMARK OFFICE
CERTIFICATE OF CORRECTION

PATENT NO. : 6,977,578 B2
DATED : December 20, 2005
INVENTOR(S) : Kline

It is certified that error appears in the above-identified patent and that said Letters Patent is hereby corrected as shown below:

Column 5,
Lines 10 and 14, after "filter" delete "," and insert -- ; --.

Signed and Sealed this

Eighteenth Day of April, 2006

JON W. DUDAS
*Director of the United States Patent and Trademark Office*